(12) United States Patent
Hiramatu et al.

(10) Patent No.: US 8,508,344 B2
(45) Date of Patent: Aug. 13, 2013

(54) INFORMATION REGISTERING APPARATUS AND INFORMATION REGISTERING METHOD

(75) Inventors: Kenya Hiramatu, Tokyo (JP); Masanori Sanbe, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 607 days.

(21) Appl. No.: 12/619,732

(22) Filed: Nov. 17, 2009

(65) Prior Publication Data

US 2010/0123562 A1    May 20, 2010

(30) Foreign Application Priority Data

Nov. 17, 2008  (JP) .................................. 2008-293785
Jul. 1, 2009   (JP) .................................. 2009-157206

(51) Int. Cl.
    *H04Q 5/22*        (2006.01)
(52) U.S. Cl.
    USPC ....... 340/10.6; 340/5.92; 235/385; 705/14.24
(58) Field of Classification Search
    USPC ........... 340/10.6, 572.1, 5.92, 1.1, 10.1–10.5;
                   709/219; 235/385; 705/14.24, 22, 28, 29
    See application file for complete search history.

(56) References Cited

U.S. PATENT DOCUMENTS

| | | | |
|---|---|---|---|
| 6,338,041 B1 * | 1/2002 | Kawamata .......................... | 705/5 |
| 2003/0066892 A1 * | 4/2003 | Akiyama .................. | 235/472.01 |
| 2008/0297314 A1 * | 12/2008 | Kuwako et al. .............. | 340/10.1 |

FOREIGN PATENT DOCUMENTS

| | | |
|---|---|---|
| JP | 04-095158 A | 3/1992 |
| JP | 07-152962 A | 6/1995 |
| JP | 2002-167011 A | 6/2002 |
| JP | 2002-215753 A | 8/2002 |
| JP | 2004-246536 A | 9/2004 |
| JP | 2008-214098 | 9/2008 |

OTHER PUBLICATIONS

Japanese Office Action Mailed Oct. 26, 2010 for Japanese Patent Application No. 2009-157206.

* cited by examiner

*Primary Examiner* — Brian Zimmerman
*Assistant Examiner* — An T Nguyen
(74) *Attorney, Agent, or Firm* — Turocy & Watson, LLP

(57) ABSTRACT

In a state in which a list generated by arranging a large number of records including at least identification information, which are stored by radio IC tags, for individually identifying objects and information derived from the identification information is acquired and displayed, the information stored by the radio IC tags is read. Then, the list is updated to and displayed in a state in which the records of the list including the read information stored by the radio IC tags are moved to the top of the list in order of the reading. Therefore, even when inventory of a large quantity of commodities is performed, it is possible to provide a customer with information concerning inventory check in an accurate and comprehensible form. As a result, it is possible to improve work efficiency of the user.

8 Claims, 13 Drawing Sheets

| COMMODITY MASTER | | | | | | |
|---|---|---|---|---|---|---|
| COMMODITY CODE | COMMODITY NAME | ITEM NUMBER | COLOR | COLOR CODE | SIZE | SIZE CODE |
| 491234567890 | T SHIRT | 65-712030 | RED | 10 | S | 02 |
| 491234567891 | T SHIRT | 65-712030 | WHITE | 21 | S | 02 |
| 491234567892 | T SHIRT | 65-712030 | YELLOW | 42 | S | 02 |
| | | | | | | |

| SHELF MASTER | | |
|---|---|---|
| SHELF ID | SHELF NAME | RFID LOCATION CODE |
| A | T SHIRT SHELF 1 | 4912345.100001.1 |
| B | T SHIRT SHELF 2 | 4912345.100001.2 |
| C | OUTER CLOTHES SHELF 1 | 4912345.100001.3 |
| | | |

| STOCK TABLE | | | |
|---|---|---|---|
| SHELF ID | COMMODITY CODE | ACTUAL QUANTITY OF STOCK | LOGICAL QUANTITY OF STOCK |
| A | 491234567890 | 0 | 4 |
| A | 491234567891 | 0 | 3 |
| A | 491234567892 | 0 | 4 |
| B | 491234567890 | 5 | 5 |
| B | 491234567891 | 6 | 6 |
| B | 491234567892 | 4 | 6 |
| | | | |

| ITEM STATE TABLE | | | |
|---|---|---|---|
| RFID ITEM CODE | COMMODITY CODE | INVENTORY STATUS | SHELF ID |
| 4912345.067890.1 | 491234567890 | 0 | A |
| 4912345.067890.2 | 491234567890 | 0 | A |
| 4912345.067890.3 | 491234567890 | 0 | A |
| 4912345.067890.4 | 491234567890 | 0 | A |
| 4912345.067891.1 | 491234567891 | 0 | A |
| 4912345.067891.2 | 491234567891 | 0 | A |
| 4912345.067891.3 | 491234567891 | 0 | A |
| 4912345.067892.1 | 491234567892 | 0 | A |
| 4912345.067892.2 | 491234567892 | 0 | A |
| 4912345.067892.3 | 491234567892 | 0 | A |
| 4912345.067892.4 | 491234567892 | 0 | A |
| 4912345.067890.5 | 491234567890 | 1 | B |
| 4912345.067890.6 | 491234567890 | 1 | B |
| | | | |

INVENTORY [NO SALES CLERK]

| COMMODITY NAME | COLOR | SIZE | NUMBER |
|---|---|---|---|
| 65-712030 | 10 | 22 | 0/14 |
| 65-712030 | 21 | 22 | 0/3 |
| 65-712030 | 42 | 22 | 0/16 |
| 65-712030 | 10 | 23 | 0/16 |
| 65-712030 | 21 | 23 | 0/16 |
| 65-712030 | 42 | 23 | 0/16 |
| 65-712030 | 10 | 24 | 0/16 |
| 65-712030 | 21 | 24 | 0/16 |
| 65-712013 | 60 | 40 | 0/16 |

TOTAL NUMBER OF INVENTORY ITEMS    B2    0 / 573

B1 — START READING    SORT ON    RETURN

B4 — STOP READING    DETAILS    PROVISIONAL DECISION — B3

INVENTORY [SALES···    16:40

FIG.14

| COMMODITY NAME | COLOR | SIZE | NUMBER |
|---|---|---|---|
| 65-711900 | 21 | 02 | 16/16 |
| 65-712030 | 10 | 22 | 0/14 |
| 65-712030 | 21 | 22 | 0/3 |
| 65-712030 | 42 | 22 | 0/16 |
| 65-712030 | 10 | 23 | 0/16 |
| 65-712030 | 21 | 23 | 0/16 |
| 65-712030 | 42 | 23 | 0/16 |
| 65-712030 | 10 | 24 | 0/16 |
| 65-712030 | 21 | 24 | 0/16 |

INVENTORY [NO SALES CLERK]

TOTAL NUMBER OF INVENTORY ITEMS: 5 / 573

- B1: START READING
- B2: SORT ON
- RETURN
- B4: STOP READING
- DETAILS
- B3: PROVISIONAL DECISION

INVENTORY [SALES···    16:41

INFORMATION REGISTERING APPARATUS AND INFORMATION REGISTERING METHOD

CROSS-REFERENCE TO RELATED APPLICATIONS

This application is based upon and claims the benefit of priority from Japanese Patent Application No. 2008-293785 filed on Nov. 17, 2008 and Japanese Patent Application No. 2009-157206 filed on Jul. 1, 2009, the entire content of which is incorporated herein by reference.

TECHNICAL FIELD

The present invention relates to an information registering apparatus and an information registering method for performing registration of information such as inventory information.

BACKGROUND

In recent years, a small medium that incorporates an IC chip and an antenna and performs communication with a dedicated reader writer in a non-contact manner via the antenna is developed. In this medium, information is written in a memory of the IC chip and information stored in the memory is read. In this medium, peculiar identification information, i.e., a so-called ID is unrewritably stored in a manufacturing stage in advance. The reader writer recognizes the medium individually on the basis of the ID stored in the medium and performs reading and writing of information. This medium is attached to an object that needs to be recognized. Information concerning the object is stored in the IC chip. A host connected to the reader writer can specify, according to information from the medium read by the reader writer, the object to which the medium is attached. In general, identification employing the medium of this type is called RFID (Radio Frequency Identification) or the like. The RFID is used in various information management systems for physical distribution management, personal information management, and the like.

In the RFID, unlike the barcode system in the past, it is unnecessary to place the reader writer on each tag. Therefore, in the RFID, it is possible to collectively read plural tags from a remote location and collectively write information in plural tags. For example, JP-A-2008-214098 discloses a stock management system that can grasp a quantity of commodity stock by simultaneously reading out information from and writing information in RFID tags attached to commodities on commodity shelves in radio communication by a handy terminal (an RFID reader writer).

In recent years, a distribution retail store employing the stock management system explained above is overflowing with an enormous number of commodities. On the other hand, the RFID tags are often introduced for the purpose of item management rather than management in item number units like a JAN code. Therefore, the handy terminal (the RFID reader writer) acquires an enormous amount of commodity information by reading RFID tags (item tags) attached to commodities.

However, the RFID reader writer used for stock management and inventory as explained above is usually a handy terminal that can be carried. Since the RFID reader writer can be carried, a display screen of the RFID reader writer is formed small. Therefore, in the RFID reader writer, screen display for, for example, checking inventoried commodities in performing inventory for a large quantity of commodities is a partial display or a fine display. In such partial display or fine display, it is likely that inventory check and stock check are inaccurate.

The present invention has been devised in view of the above and it is an object of the present invention to provide an information registering apparatus and an information registering method that can improve work efficiency.

SUMMARY

An information registering apparatus according to the present invention includes: a list creating unit configured to create a list generated by arranging a large number of records including at least identification information, which is stored by radio IC tags, for individually identifying objects and information derived from the identification information; a list display unit configured to display the created list; an information reading unit configured to read identification information stored in the radio IC tags attached to the objects; and a list-display updating unit configured to update the display of the list in order of the reading with the list updated to a state in which a record corresponding to the read identification information is moved to the top of the records arranged in the list.

An information registering method according to the present invention is an information registering method executed by the information registering apparatus, the information registering apparatus including a control unit and a storing unit, the information registering method including: a list creating unit creating a list generated by arranging a large number of records including at least identification information, which is stored by radio IC tags, for individually identifying objects and information derived from the identification information; a list display unit displaying the created list; an information reading unit reading identification information stored in the radio IC tags attached to the objects; and a list-display updating unit updating the display of the list in order of the reading with the list updated to a state in which a record corresponding to the read identification information is moved to the top of the records arranged in the list, the list creating unit, the list display unit, the information reading unit, and the list-display updating unit being executed in the control unit.

DESCRIPTION OF THE DRAWINGS

FIG. 6 is a schematic diagram of the data structure of a commodity master;

FIG. 7 is a schematic diagram of the data structure of a shelf master;

FIG. 8 is a schematic diagram of the data structure of a stock table;

FIG. 9 is a schematic diagram of the data structure of an item state table;

FIG. 12 is a front view of a screen example;
FIG. 14 is a front view of a screen example.

DETAILED DESCRIPTION

An embodiment of the present invention is explained below with reference to FIGS. 1 to 10. This embodiment is an example of application of an RFID (Radio Frequency Identification) processing system used in a distribution retail industry, in particular, an apparel industry.

RFID (Radio Frequency Identification) is processing for identifying an object by transmitting information to and receiving information from a tag (a micro radio IC chip) embedded with ID information through near-distance (several centimeters to several meters depending on a frequency band) radio communication performed by using an electromagnetic field, a radio wave, or the like.

Figure 1:
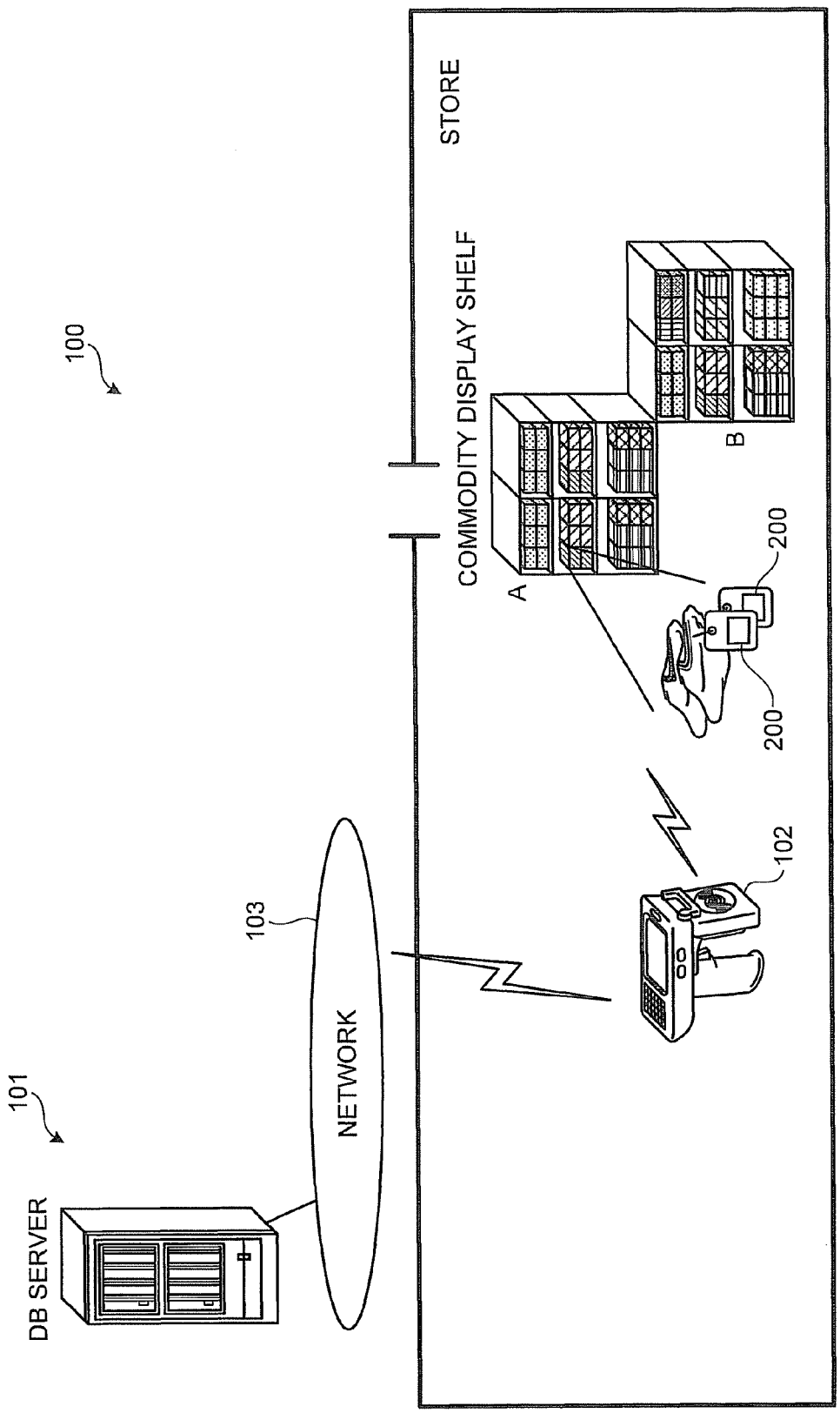
FIG. 1 is a block diagram of the configuration of an inventory processing system according to an embodiment of the present invention.

FIG. 1 is a block diagram of the configuration of an inventory processing system 100 according to this embodiment. As shown in FIG. 1, in the inventory processing system 100, a database server (hereinafter referred to as DB server) 101 and an RFID handy terminal 102 as an information registering apparatus are connected by radio via a radio communication network 103 such as a wireless LAN (Local Area Network).

RFID tags 200 in which commodity information and the like are written is attached to clothes. The RFID handy terminal 102 reads various kinds of information such as the commodity information from the RFID tags 200 of the clothes such as shirts and jackets and writes various kinds of information in the RFID tags 200.

Figure 2:
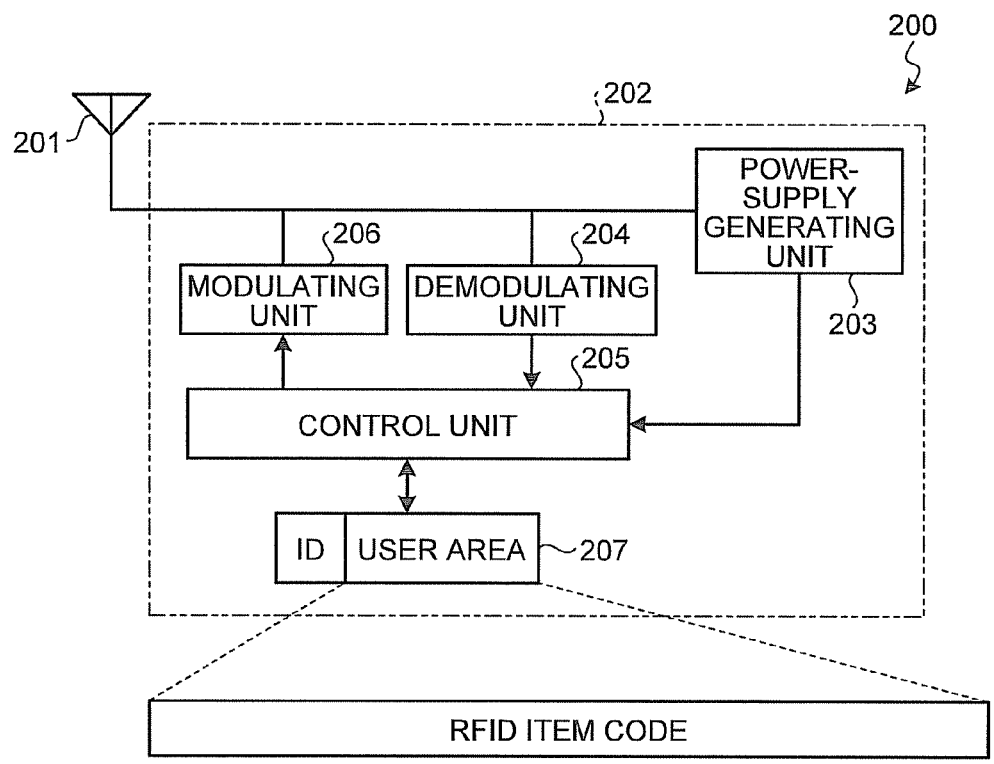
FIG. 2 is a block diagram of the main part configuration of an RFID tag.

FIG. 2 is a block diagram of the main part configuration of the RFID tag 200. As shown in FIG. 2, the RFID tag 200 includes an antenna 201 and an IC chip 202. The IC chip 202 includes a power-supply generating unit 203, a demodulating unit 204, a control unit 205, a modulating unit 206, and a memory unit 207.

The power-supply generating unit 203 supplies power to the units of the IC chip 202 by performing rectification and stabilization of a modulated wave received by the antenna 201. The demodulating unit 204 demodulates the modulated wave and sends the demodulated wave to the control unit 205. The modulating unit 206 modulates data sent from the control unit 205 and sends the modulated data to the antenna 201. The control unit 205 writes data demodulated by the demodulating unit 204 in the memory unit 207 and reads out data from the memory unit 207 and sends the data to the modulating unit 206.

The memory unit 207 is a nonvolatile rewritable memory such as an EEPROM. An ID as peculiar identification information allocated and set by a manufacturer in a manufacturing stage of the RFID tag 200 is stored in the memory unit 207 in advance. A user area in which a user can write arbitrary data is secured in the memory unit 207. An RFID item code is stored in the user area.

Figure 3:
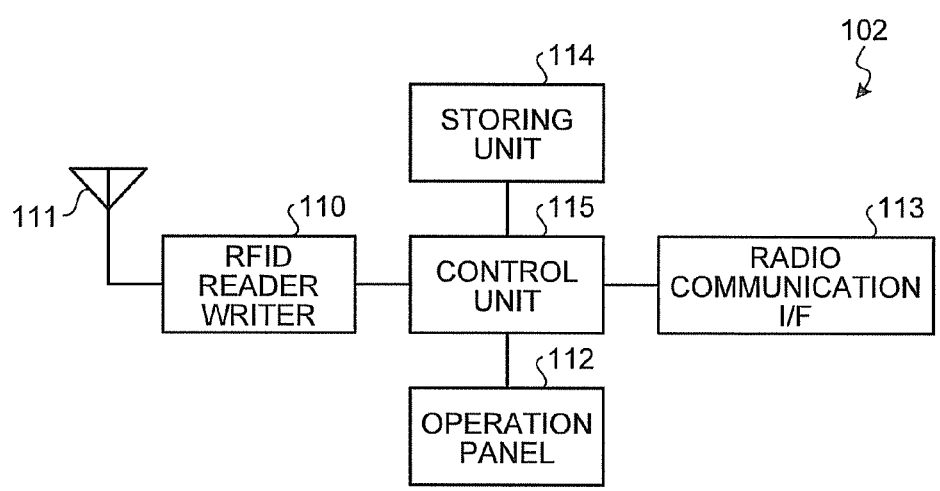
FIG. 3 is a block diagram of the main part configuration of an RFID handy terminal.

FIG. 3 is a block diagram of the main part configuration of the RFID handy terminal 102. As shown in FIG. 3, the RFID handy terminal 102 includes an RFID reader writer 110, an antenna 111, an operation panel 112, a radio communication interface 113, a storing unit 114, and a control unit 115.

The antenna 111 transmits a modulation wave according to the control by the RFID reader writer 110 and receives a modulated wave transmitted by the RFID tag 200 that receives this modulated wave. The RFID reader writer 110 reads, in a non-contact manner, data from the memory unit 207 of the RFID tag 200 present in a communication area to which the modulated wave transmitted by the antenna 111 can reach and writes data in the memory unit 207 in a non-contact manner.

A touch panel, various keys, a display device, and the like are provided on the operation panel 112.

The radio communication interface 113 connects the DB server 101 via the radio communication network 103.

Various computer programs and RFID writing data are stored in the storing unit 114. The RFID writing data is information that should be written in the memory unit 207 of the RFID tag 200. The storing unit 114 is, for example, an SRAM (Static Random Access Memory) as a flash memory.

The control unit 115 controls the RFID reader writer 110, the operation panel 112, the radio communication interface 113, and the storing unit 114.

Figure 4:
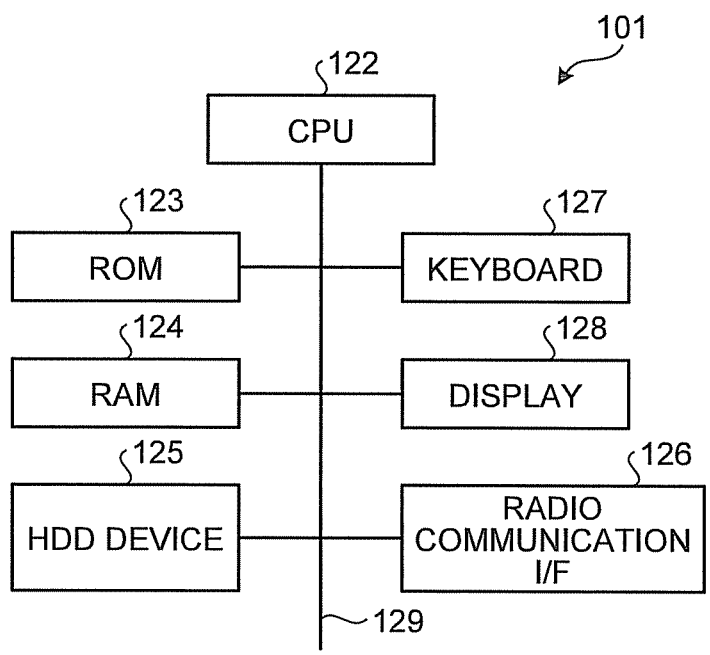
FIG. 4 is a block diagram of the main part configuration of a DB server.

FIG. 4 is a block diagram of the main part configuration of the DB server 101. The DB server 101 is, for example, a general personal computer. As shown in FIG. 4, a CPU (Central Processing Unit) 122 is mounted on the DB server 101 as a control unit main body. A ROM (Read Only Memory) 123, a RAM (Random Access Memory) 124, a HDD (Hard Disk Drive) device 125, a communication interface 126, a keyboard 127, a display 128, and the like are connected to the CPU 122 via a bus line 129 such as an address bus or a data bus.

Figure 5:
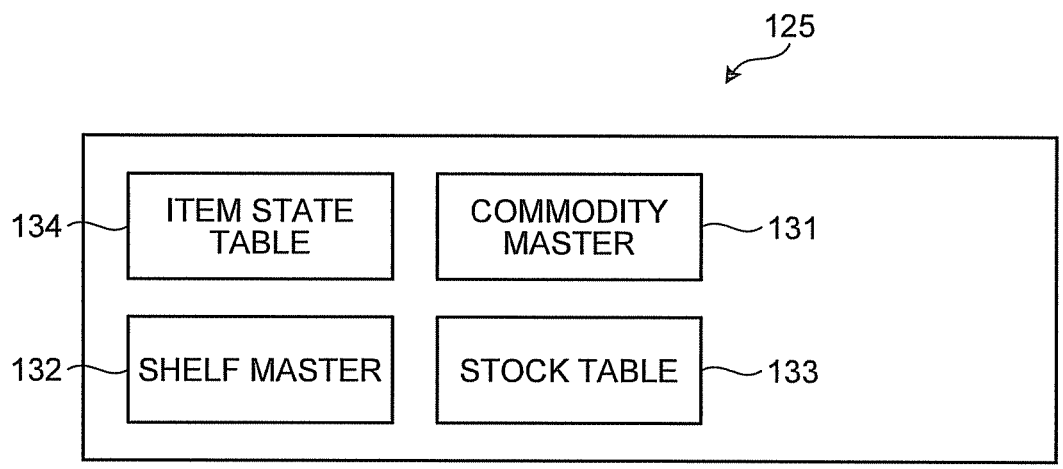
FIG. 5 is a schematic diagram of information stored in a HDD device of the DB server.

As shown in FIG. 5, a commodity master 131, a shelf master 132, a stock table 133, and an item state table 134 are stored in the HDD device 125 of the DB server 101.

As shown in FIG. 6, commodity information such as "commodity name", "item number", "color", "color code", "size", and "size code" are stored in the commodity master 131 in association with "commodity code" for identifying a commodity.

As shown in FIG. 7, commodity shelf information such as "shelf name" as a name of a shelf and "RFID location code" are stored in the shelf master 132 in association with "shelf ID" for identifying a commodity shelf on which commodities are displayed.

As shown in FIG. 8, the stock table 133 is a table for storing quantities of stock of commodities. In the stock table 133, "commodity code", "actual quantity of stock", "logical quantity of stock", and the like are stored in association with "shelf ID" for identifying a commodity shelf. The "actual quantity of stock" is a number obtained by counting, for each "commodity code", RFID tags 200 actually read by the RFID handy terminal 102. On the other hand, the "logical quantity of stock" is a number obtained by subtracting, for each "commodity code", the number of sold commodities from the number of purchased commodities, i.e., a quantity of stock for each "commodity code" in calculation. The DB server 101 may receive the number of purchased commodities and the number of sold commodities from not-shown another server or the like connected thereto via a network, calculate the "logical quantity of stock" of the stock table 133, and store the "logical quantity of stock" in the stock table 133. The DB server 101 may receive "logical quantity of stock" from not-shown another server or the like connected thereto via a network and store the "logical quantity of stock" in the stock table 133 as the "logical quantity of stock" of the stock table 133.

As shown in FIG. 9, in the item state table 134, "commodity code", "inventory status", "shelf ID", and the like are stored in association with "RFID item code" for identifying each commodity item attached with the RFID tag 200. The "inventory status" indicates whether inventory is performed for the "RFID item code".

Figure 10:
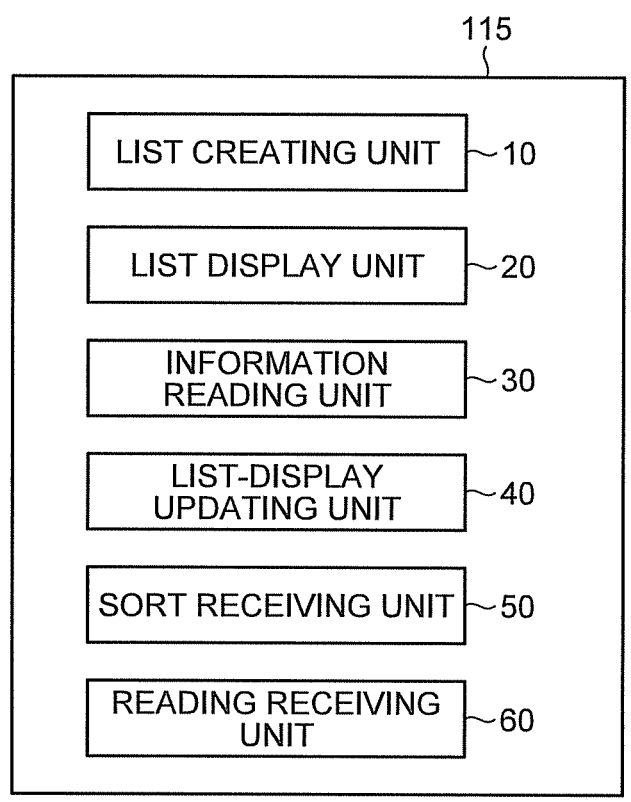
FIG. 10 is a block diagram of the characteristic functional configuration of the inventory processing system.

Characteristic processing of the inventory processing system 100 according to this embodiment is explained below. The control unit 115 of the RFID handy terminal 102 includes a control unit such as an ASIC or a CPU and storing units such as a ROM having stored therein a predetermined computer program for controlling operation and a RAM serving as a work area for the control unit (all of which are not shown in the figure) As shown in FIG. 10, the control unit 115 realizes, according to cooperation of the control unit and the computer program stored in the ROM, functional units such as a list creating unit 10, a list display unit 20, an information reading unit 30, a list-display updating unit 40, a sort receiving unit 50, and a reading receiving unit 60.

Among kinds of processing executed by the control unit 115 of the RFID handy terminal 102, inventory processing as characteristic processing is explained with reference to a flowchart of FIG. 11.

Figure 11:
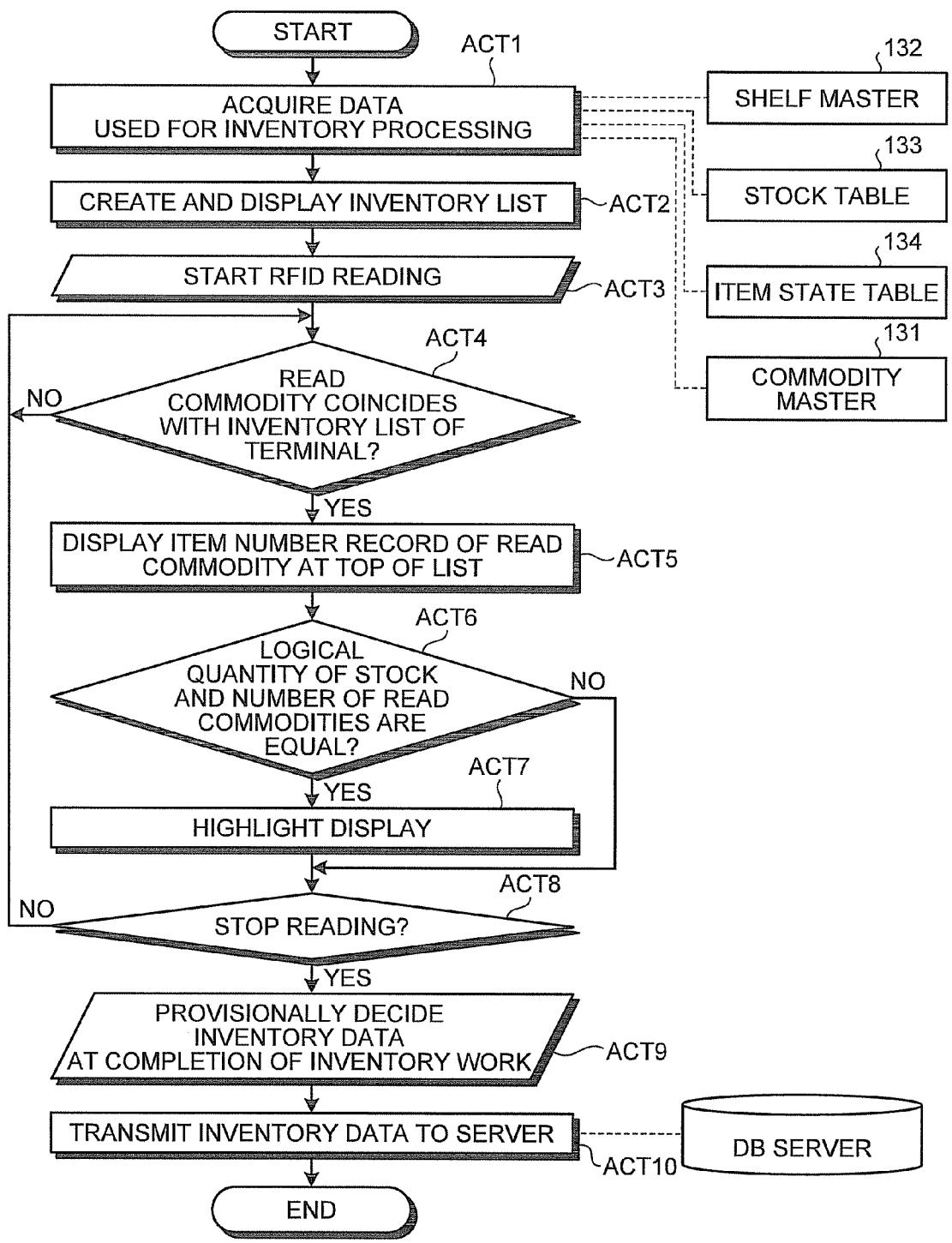
FIG. 11 is a flowchart of a flow of inventory processing.

As shown in FIG. 11, the control unit 115 of the RFID handy terminal 102 acquires data used for the inventory processing from the commodity master 131, the shelf master 132, the stock table 133, and the item state table 134 of the DB server 101 (Act 1).

Subsequently, the control unit 115 creates, on the basis of the data acquired in Act 1, an inventory list for each "item number" as a list used for inventory and displays the inventory list (Act 2: the list creating unit 10 and the list display unit 20). FIG. 12 is a front view of a screen example of the inventory list displayed on the operation panel 112 of the RFID handy terminal 102. Records arranged in the inventory list shown in FIG. 12 are "item number" as a commodity name, "color code", "size code", and "number of commodities".

The "color code", the "size code", and the "number of commodities" are associated with the "item number". The "number of commodities" is represented with the "logical quantity of stock" for each commodity code as a denominator and "number of read items" as a numerator. As the RFID tags 200 continue to be read by the RFID handy terminal 102, the "number of read items" finally reaches the "actual quantity of stock". For example, the control unit 115 of the RFID handy terminal 102 executes processing operation for calculating the "actual quantity of stock" by counting, for each "commodity code", the RFID tags 200 actually read by the RFID handy terminal 102.

As shown in FIG. 12, a "start reading" button B1 for declaring the start of reading of the RFID tags 200, a "sort ON" button B2 for declaring sort of related commodities, a "provisional decision" button B3 for declaring decision of inventory work, a "stop reading" button B4 for declaring the stop of reading of the RFID tags 200, and the like are displayed on a screen displayed on the operation panel 112. The control unit 115 receives user operation via the touch panel.

Figure 13:
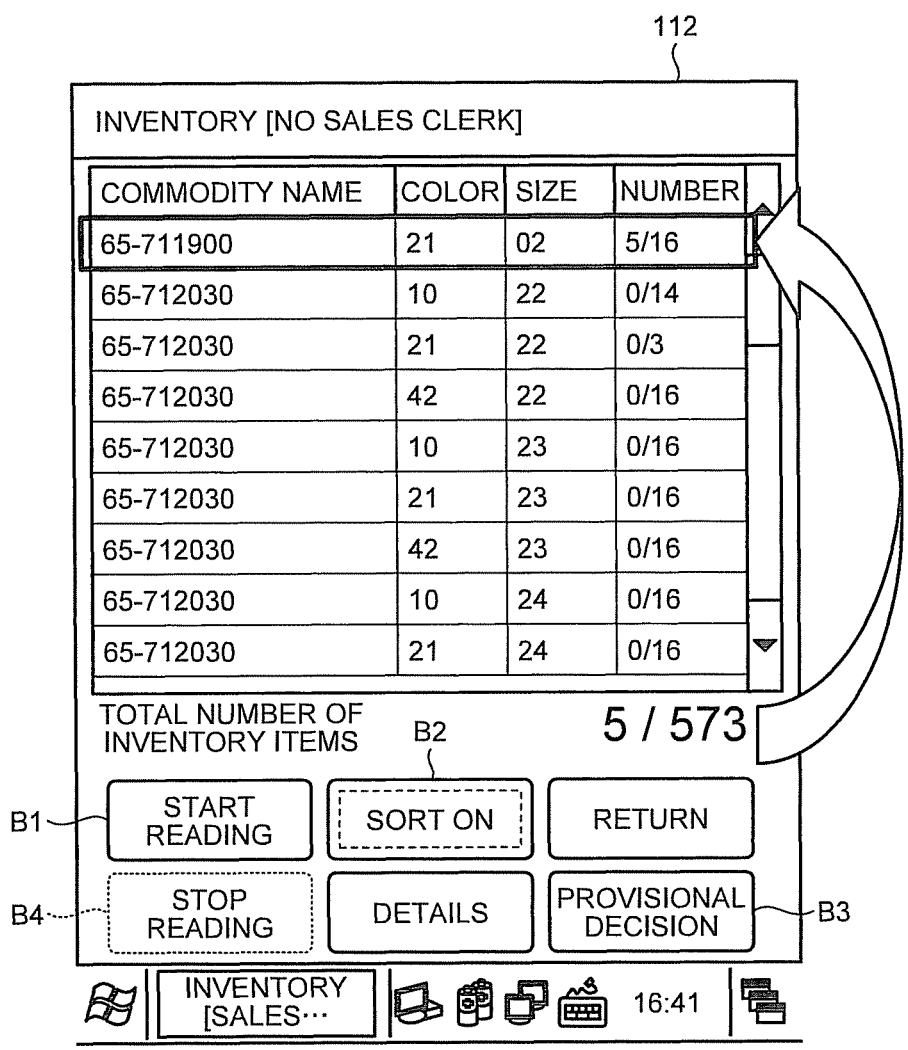
FIG. 13 is a front view of a screen example.

The control unit 115 starts reading of the RFID tags 200 attached to commodities displayed on a predetermined commodity shelf according to user operations of the "start reading" button B1 (Act 3: the information reading unit 30). The control unit 115 determines whether the "RFID item code" stored in the RFID tag 200 of a read commodity coincides with the "RFID item code" listed in the item state table 134 of the RFID handy terminal 102 (Act 4). If the control unit 115 determines that the former coincides with the latter (Yes in Act 4), as shown in FIG. 13, the control unit 115 updates the display of the list in order of the reading with the "item number" of the read commodity and records related thereto moved to the top of records arranged in the inventory list of the screen shown in FIG. 12 (Act 5: the list-display updating unit 40). More specifically, when the RFID handy terminal 102 reads and scans the RFID tags 200 attached to commodities displayed on commodity display shelves A and B shown in FIG. 1, the list-display updating unit 40 sequentially displays the commodities attached with the RFID tags 200 read by the RFID handy terminal 102 later at the top of an inventory list.

If the "RFID item code" of the read commodity coincides with the "RFID item code" listed in the item state table 134, the control unit 115 sets the "inventory status" of the item state table 134 of the RFID handy terminal 102 to "1" assuming that inventory is performed. The control unit 115 sets the "inventory status" to "1" in this way to thereby prevent the commodity single item (item) from being redundantly counted.

If the control unit 115 determines that the "RFID item code" of the read commodity does not coincide with the "RFID item code" listed in the item state table 134 (No in Act 4), the control unit 115 neglects the commodity with the "RFID item code" because the commodity is not a commodity that should be placed in a predetermined commodity shelf.

In the subsequent Act 6, the control unit 115 determines whether the "logical quantity of stock" and the "number of read items" of the "number of commodities" in the inventory list are equal.

If the control unit 115 determines that the "logical quantity of stock" and the "number of read items" are equal (Yes in Act 6), as shown in FIG. 14, the control unit 115 executes special display (e.g., highlight display) of the "item number (commodity code)" of the read commodity, the "logical quantity of stock" and the "number of read items" of the "number of commodities" of which in the inventory list are equal, and records related thereto (Act 7).

The control unit 115 repeats the processing in Act 4 to Act 7 until the RFID tags 200 of all the target commodities are read or until the reading of the RFID tags 200 attached to the commodities displayed on the predetermined commodity shelf is stopped by user operation of the "stop reading" button B4 (Yes in Act 8). As the stop of reading of the RFID tags 200 of all the target commodities, reading-end sound or the like only has to be generated from a not-shown buzzer or the like.

Thereafter, the control unit 115 provisionally decides inventory data according to user operation of the "provisional decision" button B3 at the completion of the inventory work (Act 9) and transmits the provisionally-decided inventory data to the DB server 101 (Act 10). When the inventory data is received, the DB server 101 updates the stock table 133 at predetermined timing on the basis of the inventory data. The provisionally-decided inventory data transmitted to the DB server 101 includes the "RFID item code", the "commodity code", and the "color code", the "size code", and the "number of read items (actual quantity of stock)" associated with the "commodity code".

Figure 15:
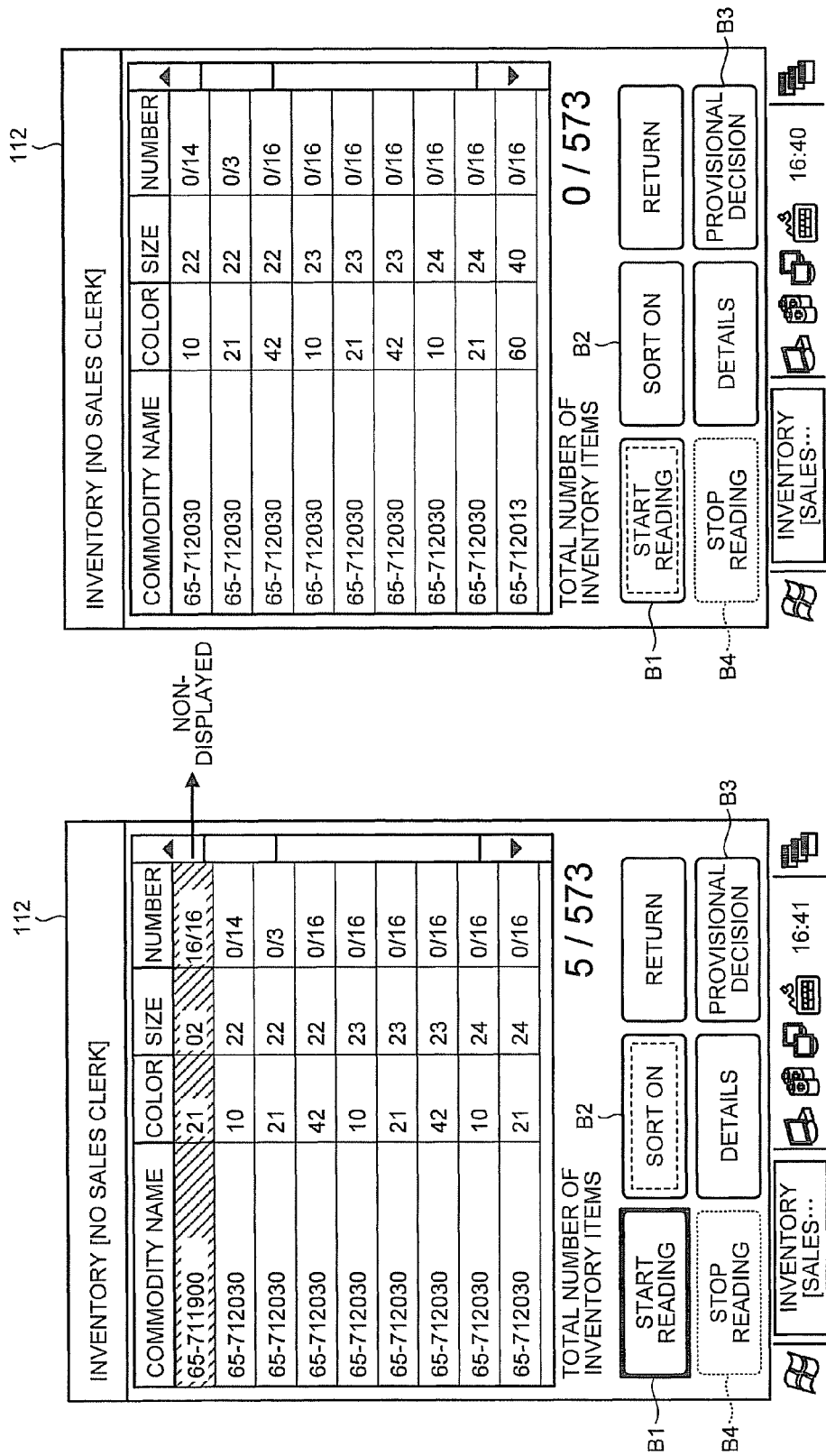
FIG. 15 is a front view of a screen example.

In the inventory processing explained above, after the RFID tags 200 of all the target commodities are read or after the reading of the RFID tags 200 attached to the commodities displayed on the predetermined commodity shelf is stopped according to the user operation of the "stop reading" button B4 (Yes in Act 8), the user operates the "start reading" button B1 for declaring the start of reading of the RFID tags 200 again (the reading receiving unit 60). Then, as shown in FIG. 15, the control unit 115 changes the "item number" of the read commodity, the "logical quantity of stock" and the "number of read items" of the "number of commodities" of which in the inventory list are equal, and the records related thereto subjected to the special display (e.g., highlight display) to non-display and displays the inventory list. In other words, as the inventory proceeds, the control unit 115 of the RFID handy terminal 102 gradually narrows down the list of commodities that should undergo inventory and displays the list.

Figure 16:
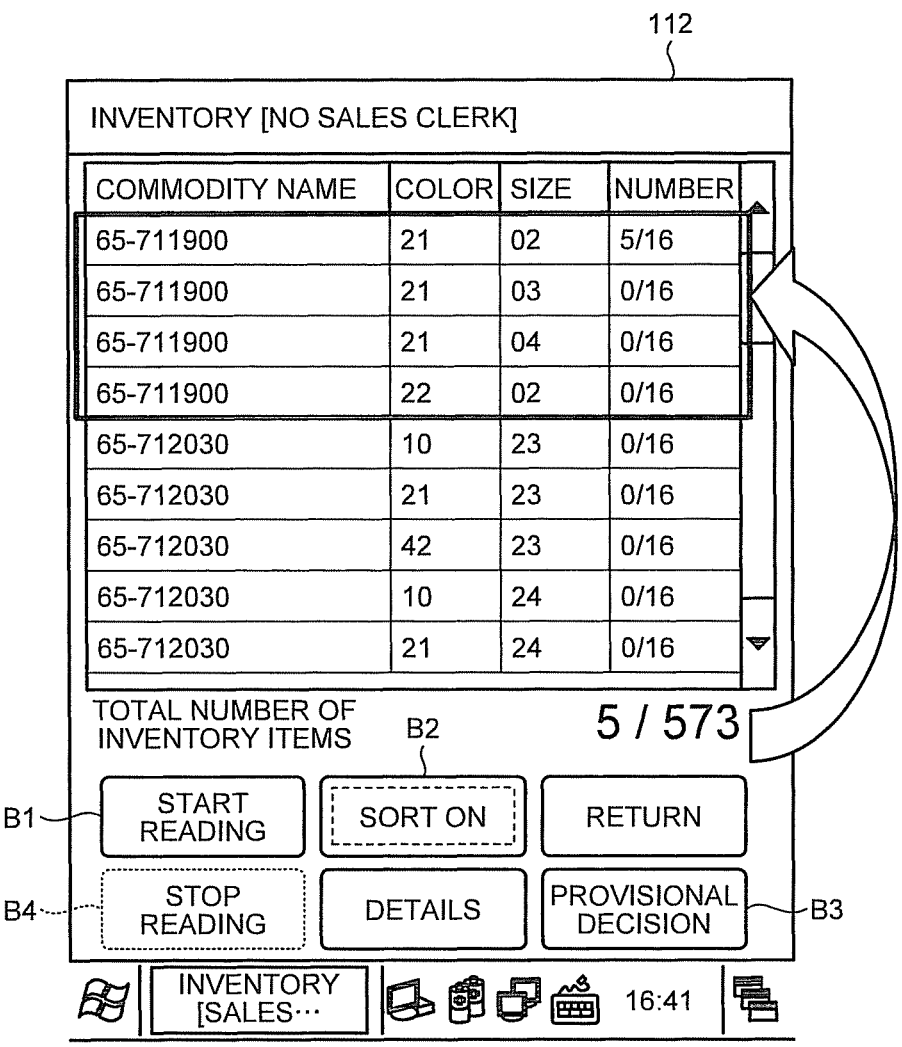
FIG. 16 is a front view of a screen example.

In the inventory processing explained above, when the user operates the "sort ON" button 52 for declaring sort of related commodities (the sort receiving unit 50), as shown in FIG. 16, concerning the read commodity and commodities of similar types (having the same item number, different colors, and different sizes), the control unit 115 collectively moves "item numbers" of the commodities of similar types and records related thereto to below the "item number" of the read commodity and the related records displayed at the top of the inventory list and displays the inventory list. Consequently, it is estimated that a probability that unread commodities related to the read commodity are present on the same commodity shelf is high. Therefore, it is possible to perform inventory while checking the unread commodities related to the read commodity.

As explained above, according to this embodiment, in a state in which a list generated by arranging a large number of records including at least identification information, which are stored by radio IC tags, for individually identifying objects and information derived from the identification information is acquired and displayed, the information stored by the radio IC tags is read. Then, the list is updated to and displayed in a state in which the records of the list including the read information stored by the radio IC tags are moved to the top of the list in order of the reading. Therefore, even when inventory of a large quantity of commodities is performed, it is possible to provide a customer with information concerning inventory check in an accurate and comprehensible form. As a result, it is possible to improve work efficiency of the user.

Further effects and modifications can be easily derived by those skilled in the art. Therefore, a broader aspect of the present invention is not limited to the specific details and the representative embodiment represented and described herein. Therefore, various modifications are possible without departing from the spirit and the scope of the comprehensive concept of the invention defined by the appended claims and their equivalents.

What is claimed is:

1. An information registering apparatus comprising:
    a list creating unit configured to create a list generated by arranging a number of records including at least identification information, which is stored by radio integrated circuit (IC) tags, for individually identifying objects and information derived from the identification information;
    a list display unit configured to display the list;
    an information reading unit configured to read the identification information stored in the radio IC tags attached to the objects;
    a list-display updating unit configured to update display of the list, in descending order of reading of the identification information, to a state in which a record corresponding to first identification information read after second identification information included in records arranged previously in the list by the list display unit is read is moved to a top of the records arranged previously in the list by the list display unit; and
    a reading receiving unit configured to receive reading of the identification information stored by the radio IC tags, wherein
    the list-display updating unit is further configured to apply a special display to a record of the list that includes information in which a logical quantity of stock in calculation, acquired in advance and included in the list, is equal to a number of read items of objects attached with the radio IC tags read by the information reading unit, and
    the list-display updating unit is further configured to change, in response to the reading receiving unit receiving the reading of the identification information stored by the radio IC tags, the record subjected to the special display to non-display and display the list.

2. The apparatus according to claim 1, further comprising a sort receiving unit configured to receive declaration of sort of related objects, wherein
    the list-display updating unit is further configured to update, in response to the sort receiving unit receiving the declaration of sort of the related objects, the list to a state in which records of the list including information concerning objects of a type similar to an object related to a record moved to a top of the list in order of reading are collectively moved to below the record moved to the top of the list and displays the list.

3. The apparatus according to claim 1, further comprising an information acquiring unit configured to acquire information from a server connected to the apparatus via a network, wherein
    the list creating unit is further configured to create the list according to the information acquired by the information acquiring unit.

4. The apparatus according to claim 1, wherein the list created by the list creating unit includes a number of read objects for respective kinds of the identification information and a logical number of objects for the respective kinds of the identification information associated with the identification information or the information derived from the identification information.

5. A method executed by an information registering apparatus, the information registering apparatus including a control unit and a storing unit,
    the method comprising:
    creating, by a list creating unit, a list generated by arranging a number of records including at least identification information, which is stored by radio integrated circuit (IC) tags, for individually identifying objects and information derived from the identification information;
    displaying, by a list display unit, the list;
    reading, by an information reading unit, the identification information stored in the radio IC tags attached to the objects;
    updating, by a list-display updating unit, display of the list in descending order of the reading to a state in which a record corresponding to a first set of the identification information read after a second set of the identification information included in the records arranged previously in the list by the list display unit is read is moved to a top of the records arranged previously in the list by the list display unit;
    applying a special display to a record of the list that includes information in which a logical quantity of stock in calculation, acquired in advance and included in the list, is equal to a number of read items of objects attached with the radio IC tags read by the information reading unit;
    receiving, by a reading receiving unit executed in the control unit, reading of the identification information stored by the radio IC tags;

changing, in response to the receiving the reading of the identification information stored by the radio IC tags, the record subjected to the special display to non-display; and displaying the list, wherein the list creating unit, the list display unit, the information reading unit, and the list-display updating unit are executed in the control unit.

6. The method according to claim 5, further comprising receiving, by a sort receiving unit executed in the control unit, declaration of sort of related objects;

updating, in response to the receiving the declaration of sort of the related objects, the list to a state in which records of the list that include information concerning objects of a type similar to an object related to a record moved to a top of the list in order of the reading are collectively moved to below the record moved to the top of the list; and displaying the list.

7. The method according to claim 5, further comprising acquiring, by an information acquiring unit executed in the control unit, information from a server connected to the apparatus via a network; and creating the list according to the information acquired by the information acquiring unit.

8. The method according to claim 5, wherein the list created by the list creating unit includes a number of read objects for respective kinds of the identification information and a logical number of objects for the respective kinds of the identification information associated with the identification information or the information derived from the identification information.

* * * * *